United States Patent [19]

Bjorklund et al.

[11] 4,187,027
[45] Feb. 5, 1980

[54] SERVO-CONTROL ALIGNMENT OF NONLINEAR CRYSTALS

[75] Inventors: Gary C. Bjorklund, West Windsor; Ralph H. Storz, Freehold, both of N.J.

[73] Assignee: Bell Telephone Laboratories, Incorporated, Murray Hill, N.J.

[21] Appl. No.: 898,371

[22] Filed: Apr. 20, 1978

[51] Int. Cl.² ............................................. G01B 11/26
[52] U.S. Cl. ..................................... 356/400; 356/152
[58] Field of Search .................. 356/31, 138, 152, 400

[56] References Cited

U.S. PATENT DOCUMENTS 3,620,599  11/1971  Ashkin .................................. 350/162

OTHER PUBLICATIONS

Yariv, *Introduction to Optical Electronics*, 1971, pp. 189-194.
Kuhl et al., *Optics Communications*, vol. 13, No. 1, Jan. 1975, pp. 6-12.
Vorsoshilov et al., *Soviet Journal of Quantum Electronics*, vol. 6, No. 3, Mar. 1976, pp. 326 and 327.

*Primary Examiner*—F. L. Evans
*Attorney, Agent, or Firm*—Daniel D. Dubosky

[57] ABSTRACT

An apparatus is disclosed for servo-locking the angular orientation of a nonlinear crystal to the angle at which phasematching occurs for nonlinear optical frequency mixing processes. Two secondary beams are generated from a beam of radiation which is incident upon the crystal. They travel through the crystal at small angles with respect to the main beam and each generates a secondary output beam containing new frequency components produced by the nonlinear optical frequency mixing process in the crystal. A discrimination signal is created by subtracting the generated power at the new frequency component of one of the secondary output beams from the generated power of the other. This signal is sensitive to the angular misalignment of the crystal and is used to drive a servo system to maintain the proper angular orientation for phasematching.

5 Claims, 9 Drawing Figures

SERVO-CONTROL ALIGNMENT OF NONLINEAR CRYSTALS

BACKGROUND OF THE INVENTION

The invention pertains to the field of nonlinear optical frequency mixing processes and more particularly to an apparatus for servo-locking a nonlinear crystal to the angle at which phasematching occurs.

The use of nonlinear optical frequency mixing processes such as second harmonic generation has an increasingly important role in applications of lasers in commercial and research environments. The generation of radiation at maximum output requires alignment of the optical axis of birefringent crystals at the proper phasematching angle with respect to the direction of propagation of incident laser beams. The phasematching angle is a function of laser frequency and also temperature. This causes the intensity of the radiation which results from the nonlinear mixing process in the crystal to drop off sharply if the frequency of the incident beam varies, if the crystal is rotated slightly from the proper phasematching angle, or if the crystal heats up upon the passage of the laser beams therethrough or due to room temperature fluctuations. In order to return to maximal output, the realignment of the crystal with respect to the beam becomes necessary. The problem becomes amplified in laser systems utilizing many nonlinear optical frequency mixing processes or for systems that need to vary laser frequencies.

SUMMARY OF THE INVENTION

The invention relates to servo-controlled alignment of nonlinear crystals. In accordance with the present invention, a signal is supplied to a servoloop which will discriminate the direction of the angular deviation from the angle at which phasematching occurs. In one embodiment, two secondary beams are generated by a grating from the laser beam which is incident upon the nonlinear crystal. These secondary beams travel through the crystal in the same direction as, but at the same small angle on either side of, the incident laser beam. The components of the secondary beams which are produced by the nonlinear optical frequency mixing processes are each detected and an electric signal is generated which is responsive to their intensity. The intensity of these beams varies with respect to the misalignment of the crystal from the optimal phasematching angle. The difference between the electric signals forms a discrimination signal which is sensitive to the direction of the displacement of the crystal from the optimal phasematching angle. The signal is positive if the angular deviation of the crystal from optimum is to one side and negative if the angular deviation of the crystal is to the other side. This discrimination signal is used to operate a servo motor which reorients the crystal.

In another embodiment of the invention, the two secondary beams are generated by reflection from the front and back surfaces of a wedge which is so placed that the secondary beams are generated after the main incident beam passes through the crystal. The secondary beams travel backward through the crystal.

A feature of the invention is that each pulse of the incident laser beam is utilized to optimize the angular orientation of the crystal. This results in a very rapid response for the system.

Another feature of the invention is the use of only two stationary radiation detectors in order to determine the angular orientation of the crystal.

Yet another feature of the invention is that the apparatus rapidly tracks the optimum angle for changing laser frequency and will make the output power relatively insensitive to the effect of differences in laser frequency.

Yet another feature of the invention is that the simple components involved are readily adaptable to inexpensive mass production.

BRIEF DESCRIPTION OF THE DRAWING

A complete understanding of the present invention and of the above and other features thereof may be gained from a consideration of the following detailed description presented hereinbelow in connection with accompanying drawings in which.

DETAILED DESCRIPTION

According to equation 8.3-5 of "Introduction to Optical Electronics" by Amnon Yariv, published by Holt, Rinehart and Winston, Inc. in 1971, the conversion efficiency of second harmonic generation of radiation from frequency $\omega$ to $2\omega$ is given by $$\frac{P_{2\omega}}{P_\omega} \propto \frac{\sin^2(\Delta k l/2)}{(\Delta k l/2)^2} \quad (1)$$

where, $P_\omega$ is the power of the incident laser beam, $l$ is the crystal length, $P_{2\omega}$ is the power of the output laser beam at frequency $2\omega$, and $\Delta k = k^{(2\omega)} - 2k^{(\omega)}$ where, $$k^{(\omega)} = \sqrt{\mu\epsilon_o n^{(\omega)}} \text{ and}$$

where, $n^{(\omega)}$ is the index of refraction of the crystal at frequency $\omega$ and $k^{(2\omega)} = 2\omega\sqrt{\mu\epsilon_o n^{(2\omega)}}$
where,
$n^{(2\omega)}$ is the index of refraction of the crystal at frequency $2\omega$. This gives $$\Delta k = 2\omega/c[n^{(2\omega)} - n^{(\omega)}] \quad (2)$$

where, c is the speed of light in the vacuum.

According to Eq. 1, prerequisite for efficient second harmonic generation is that $\Delta k = 0$ hold. This is called the phasematching requirement. This requirement may be evidenced in another way by referencing Eq. 2 as $$n^{(2\omega)} = n^{(\omega)} \quad (3)$$

i.e., the indices of refraction at the fundamental and second harmonic frequencies must be equal.

The technique that is widely used to satisfy the phasematching requirement $\Delta k = 0$ takes advantage of the natural birefringence of anisotropic crystals. In normally dispersive materials the index of the ordinary or extraordinary wave along a given direction increases with $\omega$. This makes it impossible to satisfy Eq. 3 when both waves are extraordinary or ordinary. But, under certain circumstances Eq. 3 may be satisfied by making the two waves of different types. Consider a uniaxial crystal as an example. Here the index of refraction of the extraordinary wave depends on the angle between the propagation direction and the crystal optic axis as:

$$\frac{1}{n_e^2(\theta)} = \frac{\cos^2\theta}{n_0^2} + \frac{\sin^2\theta}{n_e^2} \quad (4)$$

If $n^{(2\omega)}_e < n^{(\omega)}_O$, there exists an angle $\theta_m$ at which $n^{(2\omega)}_e(\theta_m) = n^{(\omega)}_O$; so that if the input laser beam at frequency $\omega$ is launched along $\theta_m$ as an ordinary ray, the second harmonic beam will be generated along the same direction as the extraordinary ray. As an example, in a $KH_2PO_4$ crystal, $\theta_m$ is 50.4° for a ruby wave length of 0.694 $\mu$m. Thus, to obtain phasematching along this direction, the fundamental beam in the crystal must be polarized as appropriate to an ordinary ray.

The phase mismatch $\Delta k\frac{l}{2}$ from Eq. 1 is given by $$(n^{2\omega}_e(\theta) - n^\omega_O)\omega l/c \quad (5)$$

and is thus a function of $\theta$. Thus, we find that the output power at frequency $2\omega$ is a function of $\theta$ and near $\theta_m$ varies as $$P_{2\omega}(\theta) \propto \frac{\sin^2[\beta(\theta - \theta_m)]}{[\beta(\theta - \theta_m)]^2} \quad (6)$$

where, $\beta$ is a constant depending on $n^{2\omega}_e$, $n^{2\omega}_O$, $n^\omega_O$, $\omega$ and 1.

Figure 4:
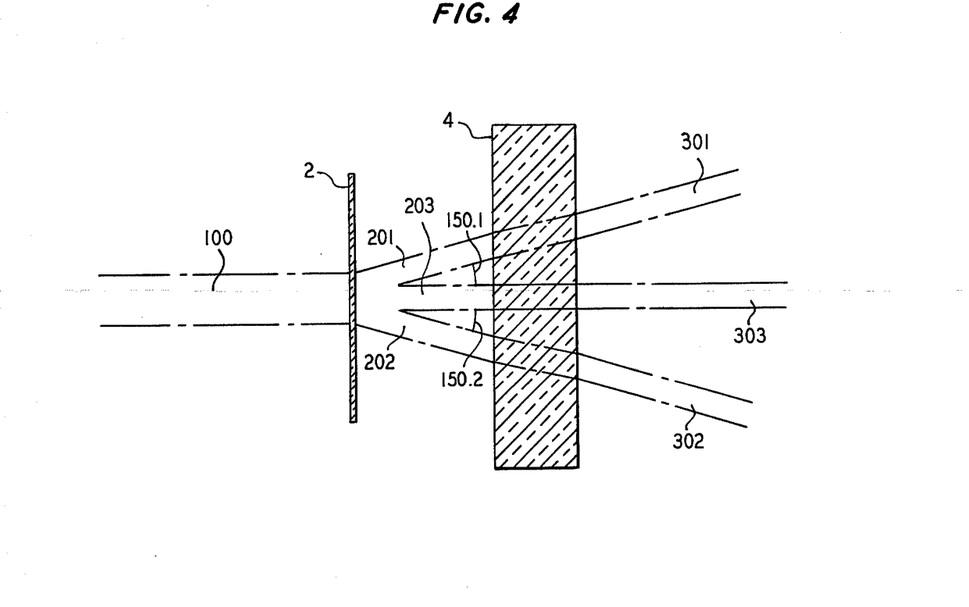
FIG. 4 shows in pictorial form the principle of operation for generating the secondary beams of the embodiment shown in FIG. 5.

FIG. 4 shows the particular aspect of the present invention relating to splitting of the input laser beam 100 by the beam splitting device 2 into a main beam 203, a first secondary beam 201 and a second secondary beam 202. The secondary beams 201 and 202 are disposed at substantially equal angles 150.1 and 150.2 on either side of the main beam 203. The three beams 201, 202 and 203 then all pass through nonlinear crystal 4 to form the output beams 301, 302 and 303 containing frequency components produced by the nonlinear optical frequency mixing process in nonlinear crystal 4. The main output beam 303 is then used for further downstream activity while secondary output beams 301 and 302 are further utilized in connection with the present invention as will be described hereinbelow.

Figure 1:
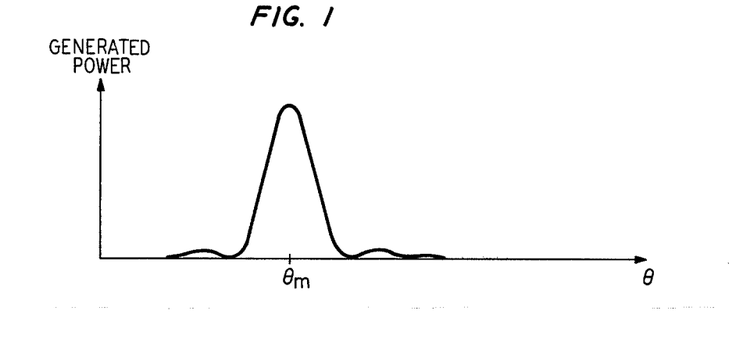
FIG. 1 shows in graphical form the generated power versus angular orientation of the signal produced by the nonlinear optical frequency process in the embodiment shown in FIG. 5.

FIG. 1 shows (in graphical form) the generated power to be expected from the output of a laser interaction with a nonlinear optical frequency mixing process in a nonlinear crystal. The generated output power is maximized when phasematching occurs and is sensitive, as was discussed above, to small changes of the angle of propagation of the input laser beam with respect to the optic axis of a birefringent crystal. $\theta_m$ denotes the orientation at which phasematching occurs and hence, represents the point at which maximum output power is generated.

Figure 2:
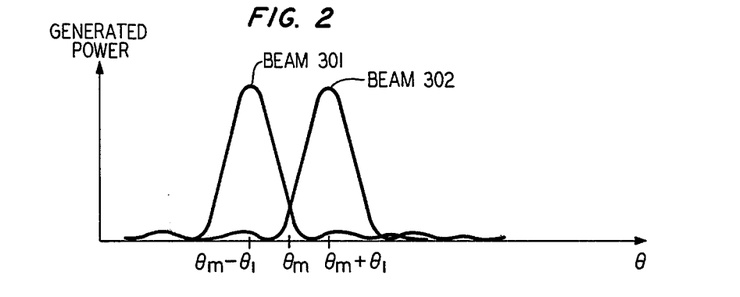
FIG. 2 shows in graphical form the generated power versus angular orientation of the secondary output beams produced by the nonlinear optical frequency process in the embodiment shown in FIG. 5.

FIG. 2 shows, in graphical form, the generated power of the secondary output beams 301 and 302 in FIG. 4 as a function of the orientation angle $\theta_1$ of the nonlinear crystal with respect to the direction of the input laser beam 100. It is seen that the generated power for each of the secondary beams 201 and 202 which pass through the crystal at angles $\pm\theta$ from the angle of propagation of the main output beam 203 follows curves which are substantially equal in shape and amplitude.

Figure 3:
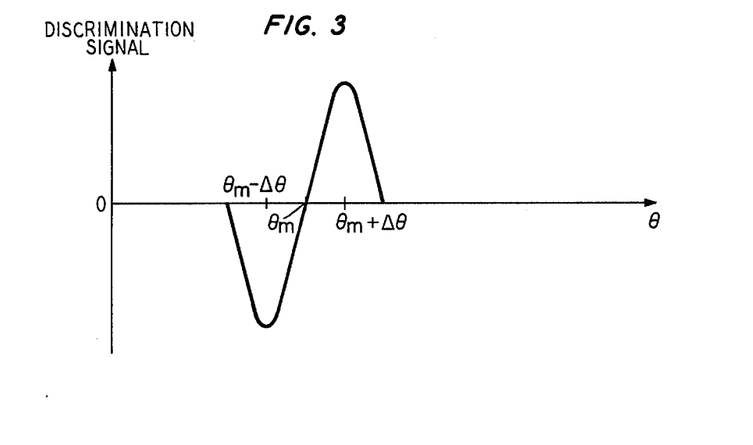
FIG. 3 shows in graphical form the discrimination signal versus angular orientation formed by subtracting the generated power of the first secondary output beam from that of the second secondary output beam in the embodiment shown in FIG. 5.

FIG. 3 shows, in graphical form, the discrimination signal that is formed when the generated output power of one of the secondary beams, e.g. 201 in FIG. 4 is subtracted from the generated output power of the other secondary beam, e.g. 202 in FIG. 4. The discrimination signal is shown as a function of the rotation angle $\theta$ of the crystal with respect to the direction of propagation of the main beam. The discrimination signal formed in zero when $\theta = \theta_m$, i.e., when phasematching occurs. The discrimination signal is a monotonically increasing function of $\theta - \theta_m$ which changes sign when $\theta - \theta_m$ changes sign in the range $$\theta_m - \theta_1 \leq \theta \leq \theta_m + \theta_1$$

where, $\theta$ is angle of rotation of the crystal with respect to the direction of propagation of the main beam, $\theta_m$ is the angle at which phasematching occurs, and $\theta_1$ is the angle that the secondary beams make with the main output beam.

It is important to note that proper servo operation requires that two conditions be satisfied for the signals displayed in FIG. 2. First is the condition that the signals are substantially symmetric in shape and amplitude with respect to one another and second is the condition that the signals overlap, as displayed, at the phasematching angle. This latter condition defines a "crystal acceptance angle" for the separation of the secondary beams 201 and 202 from the main beam 203 (in FIG. 4). In a first order approximation, the "crystal acceptance angle" condition need only be satisfied by the projection of the angle between the secondary beams and the main beam onto the plane formed by the main beam and the optic axis of the crystal. These conditions as applied to the present invention are discussed below with reference to FIG. 9.

Figure 5:
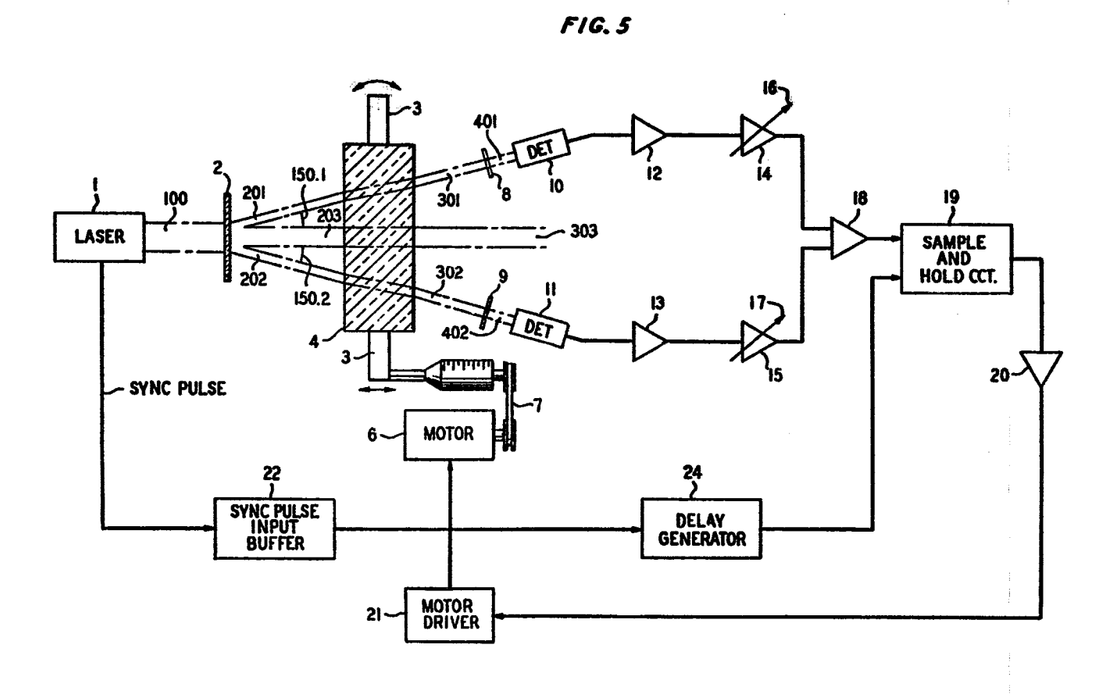
FIG. 5 shows in partially pictorial, partially schematic form an embodiment for servo-controlled alignment of nonlinear crystals.
Figure 9:
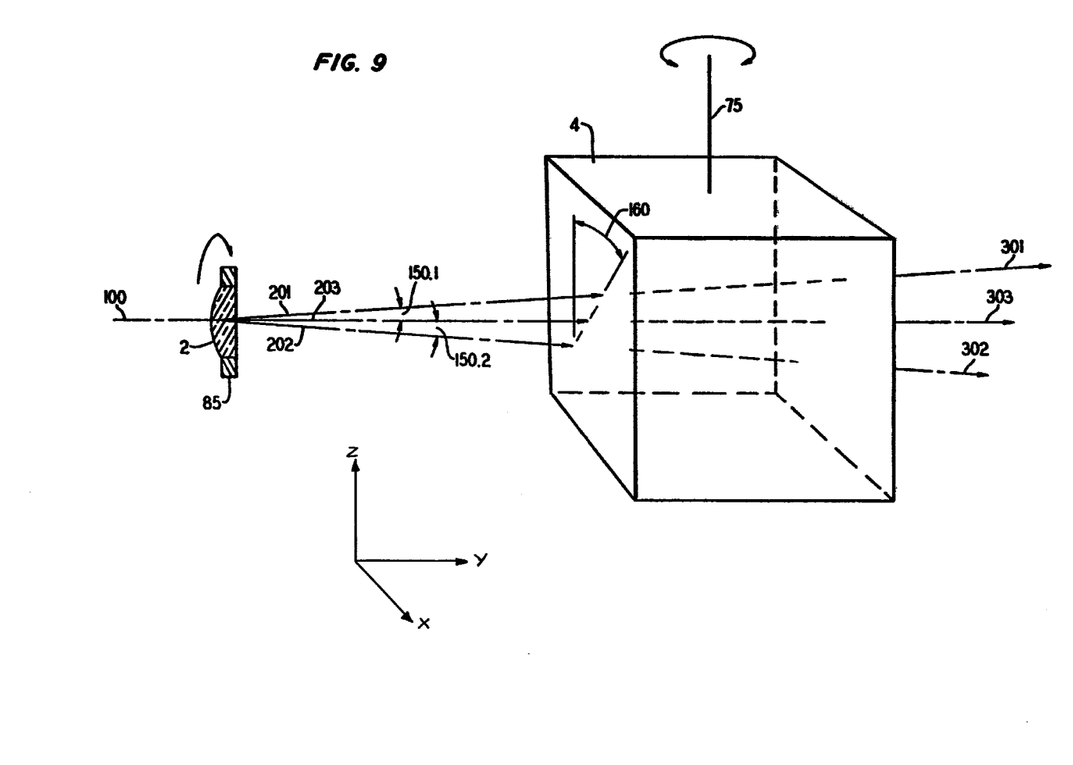
FIG. 9 shows in pictorial form the principal of operation for adjusting the beamsplitter for embodiment shown in FIG. 5.

FIG. 9 shows a further aspect of the present invention relating to the splitting of input laser beam 100 by the beam splitting device 2 into a main beam 203, a first secondary beam 201 and a second secondary beam 202 for the embodiment shown in FIG. 5. For proper function, the angles 150.1 and 150.2 which the secondary beams 201 and 202 make with respect to main beam 203 in the horizontal plane, (X-Y plane in FIG. 9) should be on the order of the "crystal acceptance angle". Upon emerging from crystal 4 the secondary output beams 301 and 302 should be easily spatially separable from the main output beam 303. Since nonlinear crystal acceptance angles can be as small as $10^{-4}$ radians, these requirements can be simultaneously achieved only with special geometries which allow large angular separations between secondary beams 201 and 202 and main beam 203 while keeping the projections of angles 150.1 and 150.2 on the horizontal (X-Y) plane arbitrarily small. This is accomplished as shown in FIG. 9. Input laser beam 100 propagates down the Y axis. Beamsplitting device 2 forms secondary beams 201 and 202 which propagate at angles 150.1 and 150.2 to either side of main beam 203. The angles 150.1 and 150.2 are a function of the beamsplitting device and are not continuously adjustable. Beamsplitter 2 is mounted in rotation stage 85 which is rotatable about the Y axis. The rotation of beamsplitter 2 also rotates the plane formed by secondary beams 201 and 202 and main beam 203. The rotation of this plane from the vertical is measured by angle 160. The optic axis of nonlinear crystal 4 lies in the horizontal (X-Y) plane. The phasematching adjustment becomes an angular rotation of the crystal about the vertical (Z axis) line 75. The effective angular separation in the horizontal (X-Y) plane is given by $\Delta\psi \simeq \theta \sin\phi$ where $\theta$ is the magnitude of angle 150.1 or 150.2 and $\phi$ is the magnitude of angle 160. Thus by adjusting the rotation angle 160, the projection of the angles 150.1 and 150.2 between secondary beams 201 and 202 and main beam 203 in the horizontal (X-Y) plane can be smoothly adjusted to very small values while maintaining good spatial separation of the secondary beams.

The only restriction is that $\phi > 5\theta$. If this is satisfied then the approximation that the phasematching is governed by the projection of the angular separation in the horizontal (X-Y) plane is valid and the phasematching angles of secondary beams 201 and 202 will be equally spaced about the value for the main beam. This restriction is not severe because a $\Delta\psi \simeq 10^{-4}$ radians can be achieved with $\phi = 3 \times 10^{-2}$ radians and $\theta = 5 \times 10^{-3}$ radians. This value of $\theta$ provides adequate spatial separation of secondary output beams 301 and 302.

The principle of operation and efficiency of the invention has been demonstrated in the embodiment shown in FIG. 5. The pulsed laser 1 produces input laser beam 100 which impinges upon the beam splitting means 2. The beam splitting means used was a wire grid from a "Nonpolarizing Wire-Grid Diffraction-Type Optical Attenuator" disclosed in U.S. Pat. No. 3,620,599. A phase grating of fused silica was used with high intensity beams because it could better withstand the exposure. The input laser beam 100 is split by beam splitting means 2 into a main beam 203 which passes therethrough in substantially the same direction as the input laser beam, a first secondary beam 201, which is disposed at a small angle 150.1 with respect to the direction of the main beam, and a second secondary beam 202 which is disposed at a small angle 150.2 with respect to the direction of the main beam and on the opposite side of the main beam from the first secondary beam. The angles 150.1 and 150.2 thus formed are substantially equal. The three beams 201, 202 and 203 pass through nonlinear crystal 4 which is mounted in rotatable support 3. In this reduction to practice, a second harmonic generation process was used and the axis of the nonlinear KDP crystal 3 was oriented so that the main beam 203 passed therethrough as an ordinary ray.

The emerging main output beam 303, which contained frequency components at the frequency of the input laser beam as well as components with a frequency double that of the input laser beam then goes on through the device for utilization in further downstream processes. The emerging secondary output beams 301 and 302 pass through filters 8 and 9 to remove frequency components equal to that of the input laser beam. The resulting beams 401 and 402, which contain frequency components double those of the input laser beam impinge on photodetectors 10 and 11. The distance between detectors 10 and 11 and crystal 4 depends on the focus of beams 301 and 302 which, in turn, depends upon the parameters of beam splitter 2. This determination for the gratings used in well known in the art. The detectors used in this reduction to practice where HP PIN 5082-4203 photo diodes. The electric signals generated in detectors 10 and 11 where fed to buffer amplifiers 12 and 13 to ensure that no loading occurred on the diodes and to allow various detectors to be used without matching impedances. The output of each buffer 12 and 13 is then amplified by amplifier stages 14 and 15. The amplifier stages 14 and 15 allow each of the outputs from detectors 10 and 11 to be matched for equal output in DC offset and amplitude when equal intensity beams impinge on each by adjustments 16 and 17. The outputs from the amplifier stages 14 and 15 are fed to differential amplifier 18 which in turn is used to subtract one of the signals from amplifiers 14 and 15 from the other. The output of differential amplifier 18 is a control signal which is positive or negative and whose amplitude depends on the difference in the intensity of radiation received by detectors 10 and 11.

If crystal 4 is not properly aligned, the differential amplifier output will be positive or negative depending on the direction crystal 4 must be rotated to form the proper angle between the optic axis and the beam direction. The signal generated by differential amplifier 18 is fed into sample and hold circuit 19. The sample and hold circuit 19 samples the differential amplifier signal during the time that the transient diode signals from the input laser beam pulse 100 are present and holds a proportional voltage level at a constant value until the next light pulse. This circuit is triggered by a sync pulse from the pulse laser 1 which is transmitted to the sync pulse input buffer 22 and delay generator 24 produces a pulse which is syncronized so that the sample and hold circuit is activated during the time that the laser pulse is generated.

The output amplifier 20 has a high input impedance to provide for long storage times for the sample and hold circuit 19 and to provide an isolated drive to the motor drive transistors 21. The motor drive transistors are complementary pairs operated from a $\pm$ supply. The direction of DC servo motor 6 is reversed by switching the polarity of the drive voltage. DC servo motor 6 is a standard servo motor with a gear reduction box. It is mechanically connected by drive belt 7 to the micrometer adjustments 5 of the crystal mounting 3 which holds the nonlinear crystal 4. The mounting 3 used was the NRC mirror mount model #600-A2.

The reduction to practice was demonstrated by using a tunable Hänsch cavity dye laser and a KDP doubling crystal. The principle was demonstrated by the following procedure:
(a) Set up a detection device for the second harmonic frequency component of beam 303 in FIG. 3.
(b) Set up the nonlinear crystal 4 so that phasematching occurs for a laser output frequency from laser 1 at approximately 5940Å.
(c) Scan the laser through the output range of 5850Å–5970Å.

Figure 7:
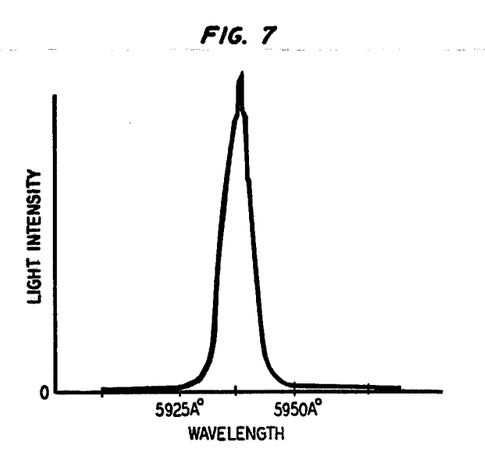
FIG. 7 shows a graph of second harmonic generation for the embodiment shown in FIG. 5 when the servo mechanism is turned off and the input laser beam wavelength is tuned over 100 Å.

FIG. 7 shows the results when the servo system is turned off and as expected the phasematching mechanism gives a maximum at approximately 5940Å and the intensity falls off sharply at either side.

Figure 8:
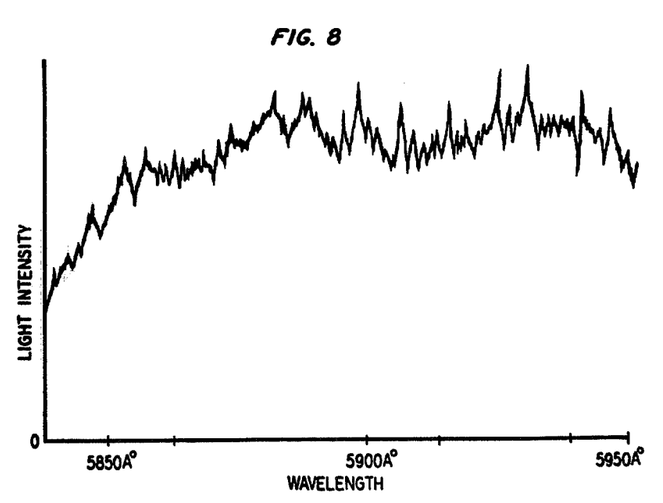
FIG. 8 shows a graph of second harmonic generation for the embodiment shown in FIG. 5 when the servo mechanism is turned on and the input laser beam wavelength is tuned over 100Å.

FIG. 8 shows the results of the above procedure when the servo system is turned on. The curve shows that as the input laser is tuned, the servo system adjusts the angle of the crystal so as to substantially meet the phasematching requirements and produce substantial second harmonic power over the entire dye laser tuning range.

A further improvement may be made to eliminate any difficulties encountered due to power level fluctuations of the input laser beam by monitoring the intensity of the main beam and dividing the discrimination signal by this quantity.

The embodiment shown in FIG. 5 will work equally well with focused laser beams. In this embodiment the focusing lens is disposed between laser 1 and beam splitter 2. The focal length of the focusing lens is chosen to bring input laser beam 100 to a focus at nonlinear crystal 4 when beam splitter 2 is not present. According to diffraction theory main beam 203 and secondary beams 201 and 202 will also come to a focus at nonlinear crystal 4.

Figure 6:
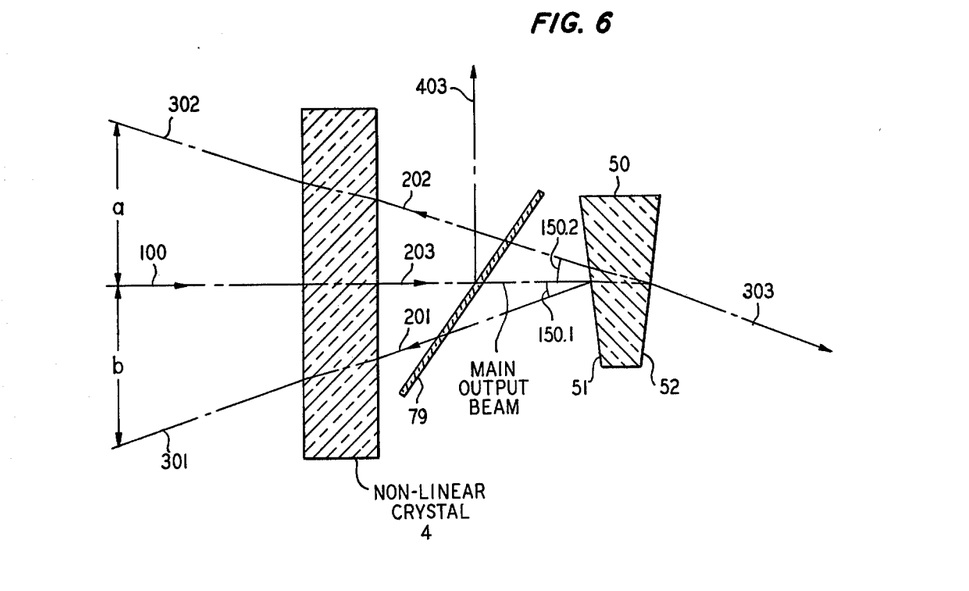
FIG. 6 shows in pictorial form the principle of operation for generating the secondary beams for a second embodiment of the invention.

FIG. 6 discloses a further aspect of the invention pertaining to a method of generating two secondary beams in order to generate the appropriate discrimination signal as produced hereinabove. In this particular method, the input laser beam 100 passes through nonlinear crystal 4 to form main output beam 203. Dichroic beam splitter 79 reflects the wavelength components which are the result of the nonlinear optical mixing process in crystal 4 into beam 403 and transmits the wavelength components which are the same as those in input laser beam 100. The first secondary beam 201 is generated by a reflection of the main output beam 203 off the first face 51 of wedge 50. The second secondary beam 202 is generated by a reflection of output beam 203 off the second face 52 of wedge 50. The two secondary beams 201 and 202 propagate back through nonlinear crystal 4 at substantially the same small angles 150.1 and 150.2 with respect to the main output beam 203 but disposed on opposite sides of it to form secondary output beams 301 and 302. They are detected in the same manner as provided for in the embodiment presented in FIG. 5. In this aspect to the invention, the reflections from the first face 51 of wedge 50 and the second face 52 of wedge 50 could be enhanced by dielectric coatings on the faces of the wedge. The wedge would be made small enough so that the direction of the main beam would not be substantially influenced by the dispersion of the wedge material.

The apparatus disclosed works equally well with wide laser beams which cause the main beam and secondary beams to spatially overlap inside the nonlinear crystal. Due to the overlapping of the beams, further nonlinear optical frequency mixing produces extra secondary output beams. However these extra beams will be propagating at different angles and by proper placement of the radiation detectors only those beams corresponding to the desired output may be selected. Thereafter the servo mechanism proceeds as described hereinabove.

What is claimed is:
1. Apparatus for servo-locking the angular orientation of a nonlinear crystal having a front surface and a back surface with respect to the direction of an input laser beam comprising:
   means disposed adjacent to said first surface of said nonlinear crystal, for splitting said input laser beam into a main beam traveling in substantially the same direction as said input laser beam, a first secondary beam disposed at a first angle relative to the direction of said main beam and a second secondary beam disposed at a second angle relative to the direction of said main beam and on the opposite side of said main beam from said first secondary beam, said first angle being substantially equal to said second angle;
   means for supporting said nonlinear crystal in a rotatable mounting in such a manner that said first secondary beam, said second secondary beam, and said main beam all pass through said nonlinear crystal to form a first secondary output beam from said first secondary beam, a second secondary output beam from said second secondary beam and a main output beam from said main beam so that said first secondary output beam, said second secondary output beam, and said main output beam all contain a further frequency component produced by the nonlinear optical mixing process in said nonlinear crystal;
   a first radiation detector means for generating a first electric signal in response to the intensity of said further frequency component of said first secondary output beam;
   a second radiation detector means for generating a second electric signal in response to the intensity of said further frequency component of said second secondary output beam;
   means for producing a discrimination signal in response to the difference between said first electric signal and said second electric signal; and
   means for rotating said rotatable mounting in response to said discrimination signal.

2. Apparatus as defined in claim 1 in which said means for splitting said input laser beam is a phase grating.

3. Apparatus as defined in claim 1 in which said means for splitting said input laser beam is a nonpolarizing wire grid diffraction grating.

4. Apparatus for servo-locking the angular orientation of a nonlinear crystal having a front surface and a back surface with respect to the direction of an input laser beam passing therethrough in such a manner as to create a main beam having substantially the same direction as said input laser beam and further having a frequency component substantially equal to the frequency of said input laser beam and a new frequency component produced by the nonlinear optical mixing process in said nonlinear crystal comprising:

a dichroic beam splitter, disposed adjacent to said back surface of said nonlinear crystal, for reflecting said new frequency component and transmitting said frequency component substantially equal to the frequency of said input laser beam to create a main output beam;

means, disposed adjacent to said dichroic beam splitter and on the opposite side of said dichroic beam splitter from said nonlinear crystal, for generating from said main output beam a first secondary beam disposed at a first angle relative to the direction of said main output beam in such a manner as to be traveling in substantially the opposite direction from said main output beam and a second secondary beam disposed at a second angle relative to the direction of said main output beam and on the opposite side of said main output beam from said first secondary beam in such a manner as to be traveling in substantially the opposite direction from said main output beam, said first angle being substantially equal to said second angle;

means for supporting said nonlinear crystal in a rotatable mounting in such a manner that said first secondary beam and said second secondary beam both pass through said nonlinear crystal to form a first secondary output beam from said first secondary beam and a second secondary output beam from said second secondary beam so that first secondary output beam and said second secondary output beam both contain a further frequency component produced by the nonlinear optical mixing process in said nonlinear crystal;

a first radiation detector means for generating a first electric signal in response to the intensity of said further frequency component of said first secondary output beam;

a second radiation detector means for generating a second electric signal in response to the intensity of said further frequency component of said second secondary output beam;

means for producing a discrimination signal in response to the difference between said first electric signal and said second electric signal; and means for rotating said rotatable mounting in response to said discrimination signal.

5. Apparatus as defined in claim 4 in which said means for splitting said transmitted beam is a wedge having a first surface for generating said first secondary beam by reflection thereon and a second surface for generating said second secondary beam by reflection thereon.

* * * * *